United States Patent
Bassanini et al.

(10) Patent No.: US 6,349,545 B1
(45) Date of Patent: Feb. 26, 2002

(54) HYBRID PROPULSION SYSTEM AND SELF-PROPELLED VEHICLE PROPELLED BY THIS SYSTEM

(75) Inventors: Paolo Bassanini; Angelo Cremonesi; Alberto Gorra, all of Lodi; Gino Mainardi, Parma, all of (IT)

(73) Assignee: Nilfisk-Advance Italia S.p.A., Guardamiglia Lodi (IT)

( * ) Notice: Subject to any disclaimer, the term of this patent is extended or adjusted under 35 U.S.C. 154(b) by 0 days.

(21) Appl. No.: 09/687,820

(22) Filed: Oct. 13, 2000

(51) Int. Cl.⁷ .................................................. F01B 21/04
(52) U.S. Cl. ........................... 60/705; 60/706; 60/716; 60/719; 180/65.2; 180/65.4
(58) Field of Search ........................ 60/698, 705, 706, 60/716, 719; 180/65.1, 65.2, 65.3, 65.4

(56) References Cited

U.S. PATENT DOCUMENTS 3,992,885 A * 11/1976 Forster ..................... 60/706 X
6,230,496 B1 * 5/2001 Hofmann et al. ............. 60/706

FOREIGN PATENT DOCUMENTS

| | | |
|---|---|---|
| DE | 4116899 A1 | 11/1991 |
| EP | 0221729 | 5/1987 |
| EP | 429058 | 5/1991 |
| EP | 534144 | 3/1993 |
| EP | 10458508 | 11/2000 |
| GB | 2245438 A | 1/1992 |

* cited by examiner

Primary Examiner—Hoang Nguyen
(74) Attorney, Agent, or Firm—Alan Kamrath; Rider, Bennett, Egan & Arundel, LLP

(57) ABSTRACT

Hybrid propulsion system comprising an internal-combustion engine (1) rotatably connected to a reversible electrical machine (2), a rechargeable battery (3), an electric driving motor (7), control apparatus (8) commanding first switching device (4, 5) for selectively connecting the battery (3) to the electric driving motor (7) and/or the reversible electrical machine (2). When the electric driving motor (7) is supplied with the current flowing in from the battery (3), said control apparatus (8) monitor the voltage at the poles (3P, 3N) of the battery (3). When the motor (7) is at least partially supplied with the current generated by the reversible electrical machine (2), owing to the latter being driven rotatably by the internal-combustion engine (1), the same control apparatus (8) monitor the voltage at the poles (2P, 2N) of the reversible electrical machine (2).

8 Claims, 4 Drawing Sheets

HYBRID PROPULSION SYSTEM AND SELF-PROPELLED VEHICLE PROPELLED BY THIS SYSTEM

TECHNICAL FIELD COVERED BY THE INVENTION

Figure 1:
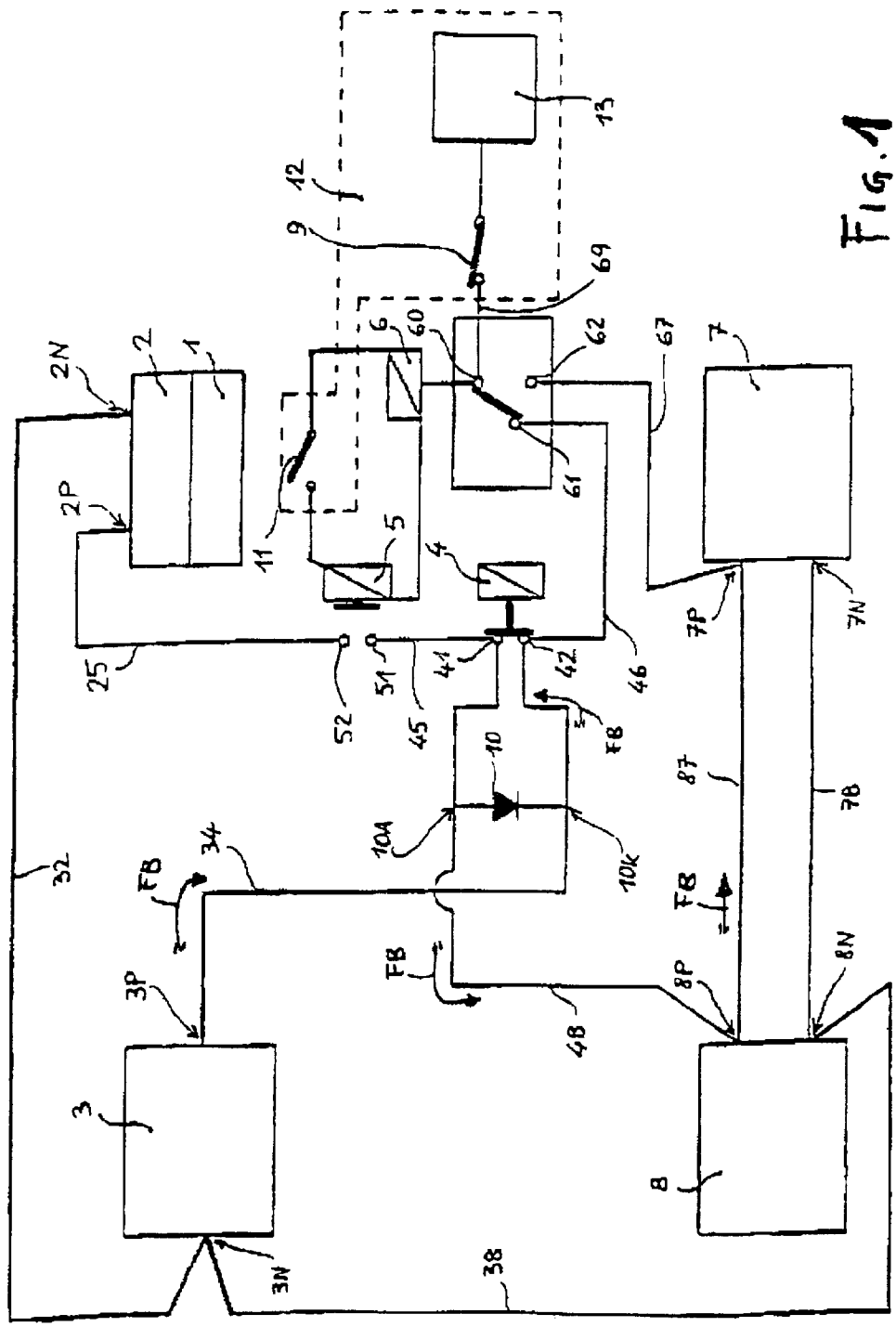

The present invention relates to a hybrid propulsion system, in which the driving wheels of a self-propelled vehicle can be driven by both an electric driving motor supplied by a rechargeable battery and an internal-combustion engine.

A typical, although not sole example of self-propelled vehicle which is particularly suited to the use of this propulsion system is constituted by the motor-sweepers, ie. the machines that are used to clean large surfaces both outdoors (where most often it is the internal-combustion engine that is preferably used) and indoors (where use is made solely of the electric driving motor).

STATE OF THE ART

Patent application EP-A-0 887 222 discloses a modern self-propelled vehicle whose hybrid propulsion system comprises:
  a rechargeable battery,
  a so-called driving motor, which is constituted by a conventional electric direct-current motor, to drive both the driving wheels and the brushes,
  an internal-combustion engine,
  a permanent-magnet motor rotatably connected with the internal-combustion motor;
  control means that are also adapted to detect the state of charge of the battery.

Under battery-supply operating conditions, the internal-combustion motor is turned off and the movement of the vehicle is ensured by the afore cited electric driving motor, which is supplied from the battery itself.

The control means, when after a prolonged period of operation from battery they detect that the charge of the battery is decayed below a pre-determined level, divert the flow of current therefrom towards the permanent-magnet motor which, owing to its being connected rotatably with the internal-combustion engine, is in this way caused to act as a starting motor for the latter.

Upon being so started, it is then the internal-combustion engine that drives rotatably the permanent-magnet motor, so that the latter is able to act as a generator of an electric current that supplies the electric driving motor so as to ensure the operation of the vehicle. A possible surplus of current generated by the permanent-magnet motor in excess of the actual current input to the driving motor, is used to recharge the battery.

As soon as the battery is again charged to its rated value, the above cited control means cause the internal-combustion engine to automatically turn off and the vehicle starts again to operate regularly from the battery as described above.

When the vehicle, during the operation of the internal-combustion engine, finds itself working under particularly difficult or hard conditions, such as for instance when it has to climb over a slope or ramp, the control means make sure that the electric driving motor is at the same time energized by the current generated by the permanent-magnet motor and the current supplied by the battery. Thanks to this buffer or boost function performed by the battery in these circumstances, a correspondinyly increased power becomes in this way available at the driving wheels so as to therefore enable the vehicle to get over the obstacle.

Although offering a number of undisputable advantages from both a construction and an operation point of view, this prior-art system of hybrid propulsion has a first drawback in the fact that the permanent-magnet motor operates to perform such duties as to start the internal-combustion engine, recharge the battery and supply a part (which may be more or less important, depending on the charge level of the battery) of the energy needed to sustain the operation of the vehicle. In other words, the permanent-magnet motor, which is a particularly useful, but also quite expensive component part, is actually able to operate at the top of its potential only when the charge of the battery is at a very low level, and this clearly puts a penalty on the overall efficiency of the system.

Furthermore, in the above described prior-art system the battery is not only subject to repeated discharge and charge phases, but also runs the risk of fully losing its charge, ie. getting fully exhausted, if, after the fuel has run fully out, the driver, the operator in charge of the vehicle fails to immediately refuel, since the battery supplies also the permanent-magnet motor that forcedly drives the internal-combustion engine into rotation. Apart from the impossibility for the work to be completed, this brings about a twofold drawback, ie. the need for the internal-combustion engine to be at this point started solely by hand, after refuelling, and the need for the battery to be recharged by means of a separate battery-charger.

SUMMARY OF THE INVENTION

It is a purpose of the present invention to provide a hybrid propulsion system that not only has a high efficiency, but also does away with the above cited drawbacks, as well as a self-propelled vehicle using such a hybrid propulsion system.

A propulsion system and a self-propelled vehicle with the characteristics as recited in the appended claims enable such an aim to be reached.

DESCRIPTION OF A PREFERRED EMBODIMENT OF THE INVENTION

Figure 2:
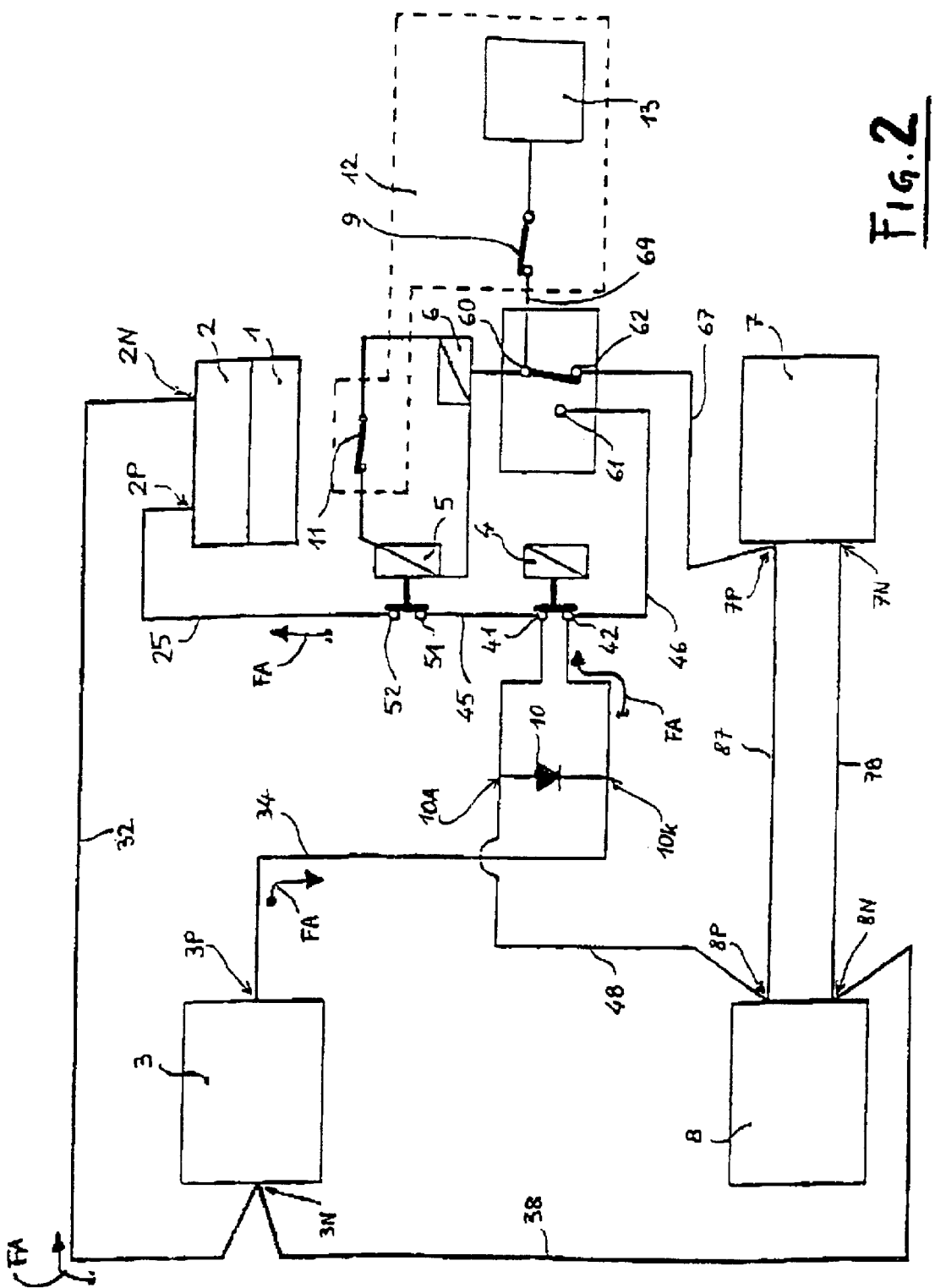
Figure 3:
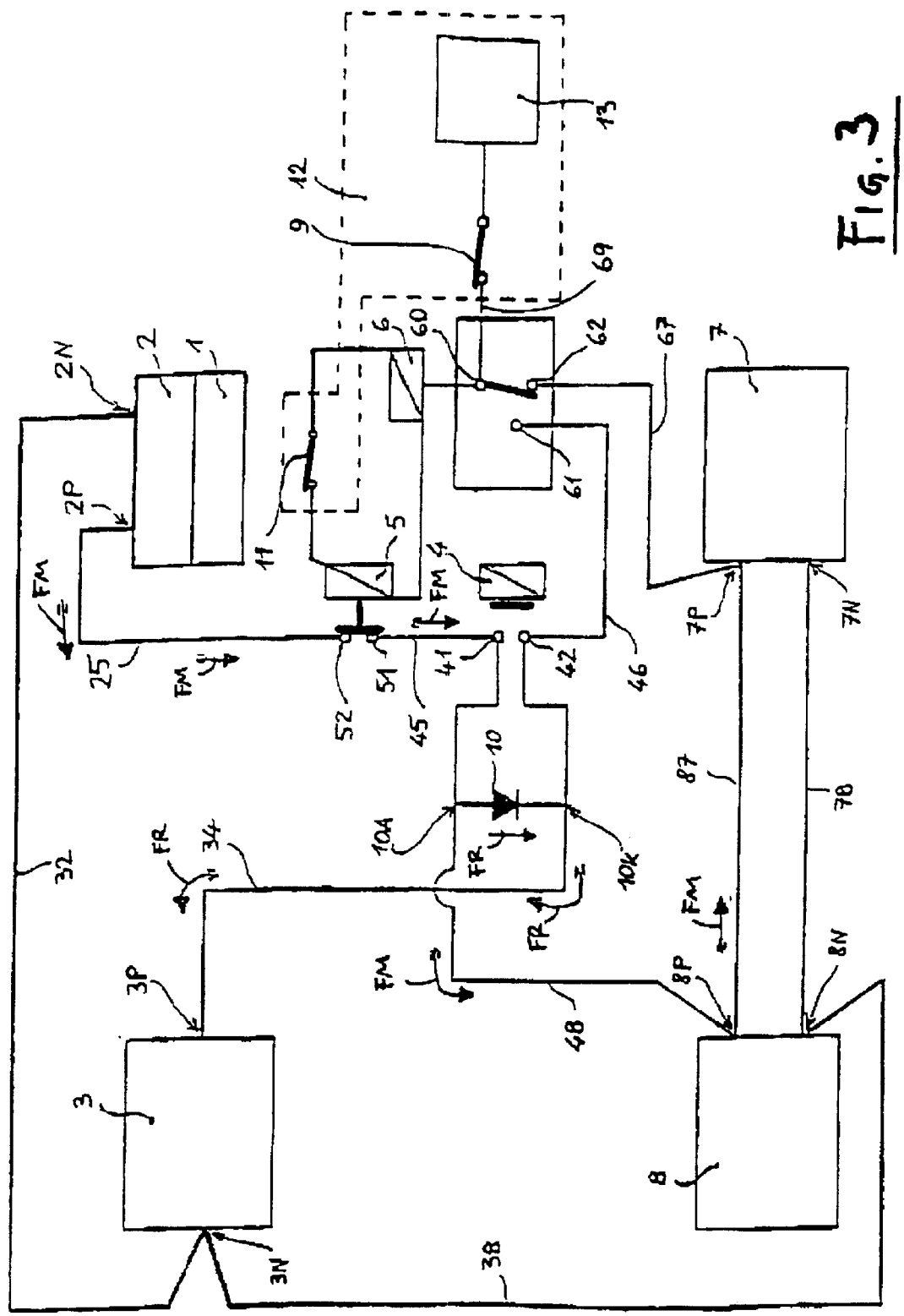
Figure 4:
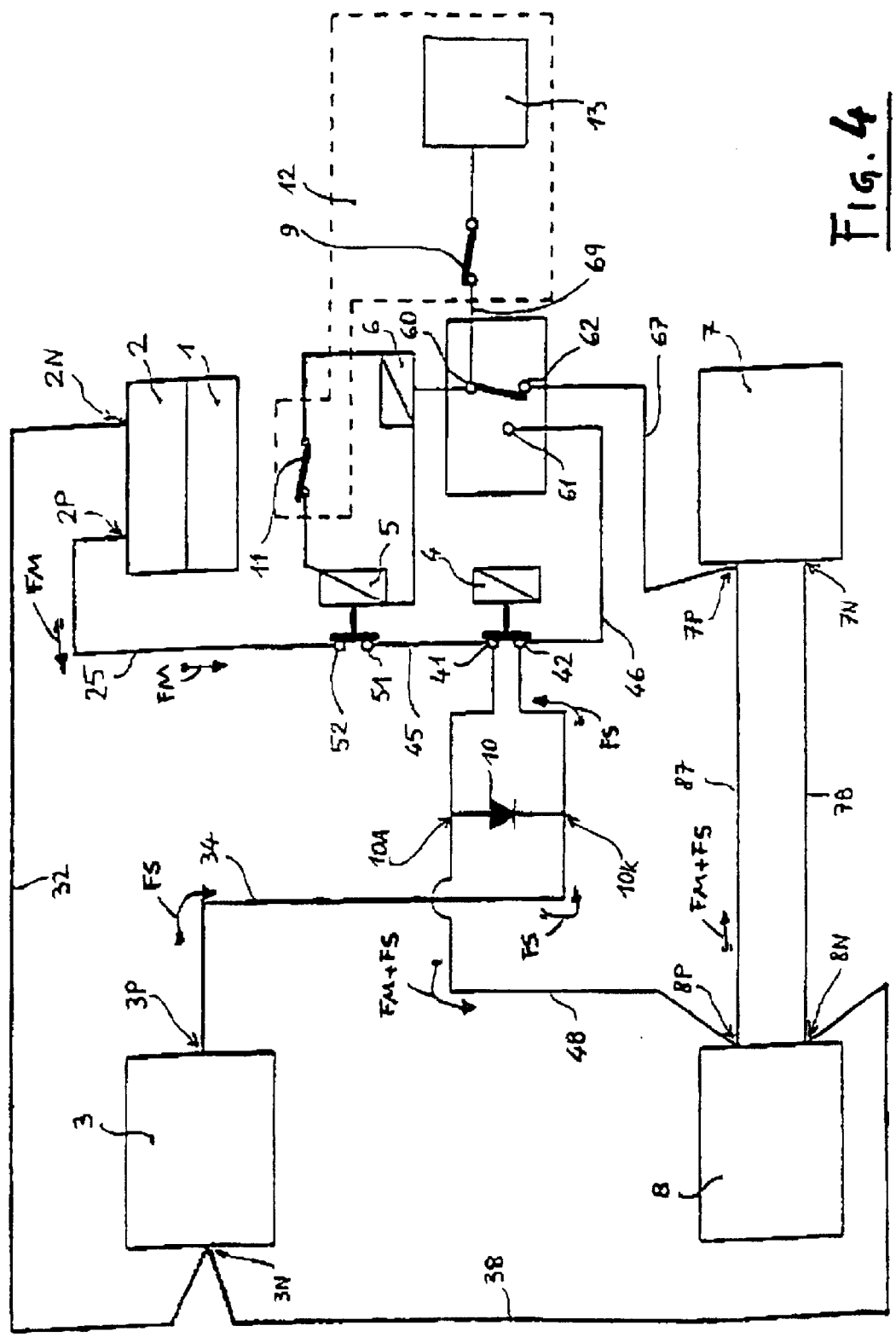

In order to enable the features and advantages of the present invention to be more readily and clearly understood, a preferred, although not exclusive embodiment of the invention is described below with reference to the accompanying drawing illustrating, in the form of a block diagram, a propulsion system used in a motor-sweeper, in four different operating configurations thereof, in which:

FIG. 1 refers to the condition in which the vehicle operates from battery;

FIG. 2 refers to the condition in which the internal-combustion engine is started;

FIG. 3 refers to the condition in which the system operates with the internal-combustion engine; and FIG. 4 refers to the operation of the system under difficult working conditions.

A hybrid propulsion system according to the present invention substantially includes:
  an internal-combustion diesel-cycle or similar engine 1;
  a permanent-magnet motor 2 that is directly connected rotatably with the internal-combustion engine 1;
  a battery 3;
  control means comprising a microprocessor-based electronic module or board 8, a first and a second normal open contactor 4, 5, and an exchange relay 6;
  an electric direct motor 7, referred to as the driving motor in this description, to drive both the driving wheels and the cleaning brushes;

a main on-off switch 9, which is actuatable by the operator and is situated on the control panel 12 of the motor-sweeper where there are also provided, in series with said switch 9, a display 13 showing the value of the voltage at the poles 3P and 3N of the battery 3.

The coil of the second contactor 5 is inserted in a circuit connected to the microprocessor-based board 8, and is further connected in series with the single-pole switch 11, provided as a starting switch for the internal-combustion engine 1, as well as with the coil of the exchange relay 6. The latter comprises a common contact 60, which is connected in series to the main switch 9 via a conductor lead 69, and two alternative contacts 61 and 62 that are connected to other parts of the circuit, as this will be described in greater detail further on. The coil of the first contactor 4 is in turn connected with the main switch 9 and the microprocessor-based electronic board 8 via conductor leads that are not shown in the Figures for reasons of greater simplicity.

The first fixed contacts 41, 51 of the first contactor 4 and the second contactor 5, respectively, are connected with each other via a first conductor lead 45. The second fixed contact 42 of the fit contactor 4 is connected via a second conductor lead 46 to the first fixed contact 61 of the exchange relay 6, while the second fixed contact 62 of the same relay is connected via a third conductor 67 to the positive pole 7P of the driving motor 7. The second fixed contact 52 of the second contactor 5 is on the contrary connected with the positive pole 2P of the permanent-magnet motor 2 via a fourth conductor lead 25.

The above cited electric component parts are further connected to each other in the following manner:

the negative poles 2N of the permanent-magnet motor 2 and 3N of the battery 3 via a fifth conductor lead 32;

the same negative pole 3N of the battery 3 with the negative pole 8N of the electronic board 8 via a sixth conductor lead 38;

the negative poles 8N of the microprocessor-based electronic board 8 and 7N of the driving motor 7 via a seventh conductor lead 78;

the positive pole 7P of the same driving motor 7 with the positive pole 8P of the electronic board 8 via an eighth conductor lead 87;

the same positive pole 8P of the electronic board 8 with the already cited first fixed contact 41 of the first contactor 4 via a ninth conductor lead;

the second fixed contact 42 of the same first contactor 4 with the positive pole 3P of the battery 3 via a tenth conductor lead 34.

Finally, between a first portion of said ninth conductor lead 48 and the terminal portion of said tenth conductor lead 34 there is connected a diode 10 in such a manner as to have the anode 10A thereof on the conductor lead 48 and the cathode 10K thereof on the conductor lead 34.

Description of the operation

Normally, the motor-sweeper is operated from the battery, in a configuration of the propulsion system thereof corresponding to the one illustrated in FIG. 1. In order to start this mode of operation, the driver, or operator, turns the key on the control panel 12 so as to close the main switch 9 and connect the contacts 60 and 61 of the exchange relay 6 to each other. Only the coil of the first contactor 4 is in this way energized, so that the armature thereof closes on the fixed contacts 41 and 42, thereby establishing a connection between the positive pole 3P of the battery 3 and the positive pole 7P of the driving motor 7 via the conductor leads 34, 48, 87. Since the negative poles 3N and 7N are connected to each other via the conductor leads 38 and 78, the driving motor 7 receives from the battery 3 alone the current it needs to drive and operate the motor-sweeper, so as indicated by the arrows FB in the Figure. Via the same conductor leads 34, 48 and 38, the microprocessor-based electronic board 8 performs a constant monitoring of the voltage at the poles 3N and 3P of the battery 3 and the related indication of the value thereof is transferred to the display 13 via the conductor leads 46, 69 and the contacts 61, 60 of the exchange relay 6.

According to a feature of the present invention, when the propulsion system is operating according to this configuration, the microprocessor-based board 8, as soon as it detects that the voltage at the poles 3N, 3P of the battery 3 is deceased below a pre-determined safety threshold value, de-energizes the coil of the first contactor 4 by separating the armature thereof from the fixed contacts 41 and 42 so as to cause the driving motor 7, and therefore also the motor-sweeper, to immediately stop. The driver sees such a low value of the voltage of the battery 3 indicated on the display 13 and therefore starts the procedure for starting the internal-combustion engine 1 by deciding whether to go on with the work by letting the motor-sweeper be operated by the internal-combustion engine 1 alone, as this will be better explained further on, or to make use of a traditional battery charger (separate from the vehicle) in view of bringing the battery voltage again up to the rated value thereof before going on working with the motor-sweeper operating regularly from the battery.

In order to start the internal-combustion engine 1, the driver must close manually the switch 11 that is provided on the control panel 12, so that the coil of the exchange relay 6 connects the contacts 60 and 62 with each other and, via the already mentioned connections with the microprocessor-based electronic board 8, energizes the coils of both contactors 4 and 5. The armatures thereof are thereby caused to close on the respective fixed contacts 41, 42 and 51, 52 and the propulsion system takes on the operating configuration which is particularly illustrated in FIG. 2. In this way, the battery 3 and the permanent-magnet motor 2 are connected not only via the conductor lead 32 between the negative poles 3N and 2N, but also via the conductor leads 34, 45, 25 between the respective positive poles. 3P and 2P. In this way, the permanent-magnet motor 2 is in the condition in which it is supplied by the battery 3, as indicated by the direction of the arrows FA in the Figure, and, after starting, rotatably drives the associated internal-combustion engine 1, thereby causing it to start.

As soon as it reaches steady-state, ie. rated operation conditions, the internal-combustion engine 1 rotatably drives the permanent-magnet motor 2 and the voltage at the poles 2P, 2N thereof exceeds the voltage at the poles 3P, 3N of the battery 3. Via the same conductor leads 48, 45, 25 and 38, 32, respectively, the microprocessor-based electronic board 8 starts in this way to monitor the voltage at the poles 2P, 2N of the permanent-magnet motor 2 and, at the same time, de-energizes the coil of the first contactor 4, while keeping the coil of the second contactor 5 in its energized state. As a result, the fixed contacts 41, 42 of the first contactor remain disconnected from each other, while the fixed contacts 51, 52 of the second contactor remain connected to each other, thereby enabling the propulsion system to take the configuration that is illustrated in FIG. 3. In this way, the motor-sweeper starts to operate as driven by the driving motor 7, which is supplied by the current (indicated by the arrows FM in the Figure) generated by the permanent-magnet motor 2 in a circuit that extends from the positive pole 2P to the negative pole 2N via the conductor leads 25, 45, 48, 87 and 32, 38, 78.

According to an important feature of the present invention, throughout the period of time during which the operating configuration of the propulsion system is the one shown FIG. 3, the microprocessor-based electronic board 8 keeps monitoring the voltage at the poles 2P, 2N of the permanent-magnet motor 2 via the same conductor leads 25, 45, 48, 87, 67 and 32, 38, respectively. The value of such a voltage keeps being indicated on the display 13 of the control panel 12 thanks to the conductor leads 67, 69 and the exchange relay 6 being closed on the contacts 60, 62, as well as the fact that the main switch 9 continues to stay closed.

Should the fuel eventually run out, so as to cause the internal-combustion engine 1 and, as a result, also the permanent-magnet motor 2 to stop, the connection between the latter and the battery 3 is discontinued owing to the fact that the coil of the first contactor 4 is not energized. Of course, the bias of the diode 10 is such as to prevent a current from flowing from the conductor lead 34, ie. the positive pole 3P of the battery 3, to the conductor lead 48.

During the operation of the internal-combustion engine 1, ie. in the operating configuration of the propulsion system illustrated in FIG. 3, a possible surplus of current generated by the permanent-magnet motor 2 with respect to the actual amount absorbed by the driving motor 7, is transferred to the positive pole 3P of the battery 3, stating from the first fixed contact 41 of the first contactor 4, via the first portion of the conductor lead 48, the diode 10 and the terminal portion of the conductor lead 34, as indicated by the arrows FR in the Figure. Also in this situation, the bias of the diode 10 is such as to prevent the battery 3, once that the voltage thereof has been brought back to its rated value, from leaking current starting from its positive pole 3P.

When the motor-sweeper then possibly happens to face particularly difficult or hard working conditions (as may for instance be caused by the presence of an ascending slope of the surface to be cleaned), this of course causes the voltage at the poles 2P and 2N of the permanent-magnet motor 2 to undergo a decrease which, thanks to the above described connections, the microprocessor-based electronic board 8 is however capable of detecting without any delay, and which is of course also duly indicated on the display 13. Should this voltage decrease below to the already mentioned safety threshold value for a longer time duration than a simple instant, the same microprocessor-based electronic board 8 commands the coil of the first contactor 4 to be energized, while also keeping the coil of the second contactor 5 energized, without any need for the driver to intervene.

The propulsion system switches in this way over to the operating configuration illustrated in FIG. 4, in which the first fixed contact 41 of the first contactor 4 is reached by both the current generated by the permanent-magnet motor 2, via the conductor leads 25, 45 (as indicated by the arrows FM in the Figure), and the current delivered by the positive pole 3P of the battery 3 via the conductor lead 34 (as indicated by the arrows FS in the Figure).

As a result, via the conductor leads 48 and 87 to the positive pole 7P of the driving motor 7 there arrives a current (as indicated by the arrows FM+FS in the Figure) which is greater than the one prevailing in the previously described operating configuration of the propulsion system, ie. the one relating to normal working conditions of the motor-sweeper. Such an increased current is therefore able to supply the driving motor 7 with the additional amount of power needed for the motor-sweeper to be able to perform its duty also under difficult or hard working conditions.

As soon as these difficult working conditions cease to exist, the voltage at the poles 2P, 2N of the permanent-magnet motor 2 goes back to a normal value which is higher to the afore cited lower safety threshold value and is immediately detected by the microprocessor-based electronic board 8. Again without any need for the driver or operator to intervene, the microprocessor-based electronic board 8 causes only the coil of the first contactor 4 to be de-energized, thereby opening the armature thereof, while keeping the coil of the second contactor 5 in its energized state. The operating configuration of the propulsion system is now again the one illustrated in FIG. 3, which has already been described above, so that no further explanation needs here to be given in this connection.

Advantages of the invention

From the description given above, a hybrid propulsion system according to the present invention can be inferred to essentially have following advantages:

- since the microprocessor-based electronic board 8 performs a voltmetric type of control and monitoring function (ie. the one concerning the voltage at the poles 3P, 3N of the battery 3 when the operation is ensured by the driving motor 7, and the voltage at the poles 2P, 2N of the permanent-magnet motor 2 when the operation is on the contrary ensured by the internal-combustion engine 1), the construction of the propulsion system is particularly simplified;
- owing to the fluctuations of the voltage being so monitored voltmetrically are anyway smaller than the ones of the current being absorbed by the driving motor 7, the likeliness of the permanent-magnet motor 2 undergoing repeated, ie. frequent on and off cycles is reduced;
- thanks to the driving motor 7 stopping immediately when the battery voltage decreases below the pre-determined safety threshold value, the risk is eliminated for the same battery to run completely out of its charge inadvertently, ie. without the operator noticing it;
- no specific component parts (the so-called level indicators) are needed to indicate that the fuel used by the internal-combustion engine 1 has run out, since the propulsion System stops immediately when the internal-combustion engine 1 ceases to operate Although the above description of a hybrid propulsion system specifically refers to the use thereof in a motor-sweeper, it will be appreciated that it is suitable for use also in connection with other types of self-propelled vehicles.

It will further be appreciated that this hybrid propulsion system may of course be Implemented in a number of different forms and variants with respect to the above described embodiment without departing from the scope of the present invention. For instance, another type of reversible electrical machine may be used instead of the permanent-magnet motor 2, and other electromechanical or solid-state component parts may take the place of the contactors 4, 5 and the exchange relay 6.

What is claimed is:

1. Hybrid propulsion system for a self-propelled vehicle comprising:
   an internal combustion engine (1) rotatably connected to a reversible electrical machine (2),
   a rechargeable battery (3),
   an electric driving motor (7) capable of being selectively supplied with the current flowing in from the battery (3) and/or generated by said reversible electrical machine (2) when the latter is driven rotatably by said internal-combustion engine (1), control means (8), first switching means (4, 5) operated by said control means (8) to selectively connect the battery (3) to the electric driving motor (7) and/or the reversible electrical machine (2), characterized that, when the driving motor (7) is supplied with the current flowing in from the battery (3), said control means (8) continuously monitor the voltage at the poles (3P, 3N) of the battery (3), while, when the driving motor (7) is at least partially supplied with the current generated by said reversible electrical machine (2), the same control means (8) continuously monitor the voltage at the poles (2P, 2N) of said reversible electrical machine (2).

2. Hybrid propulsion system according to claim 1, characterized in that said control means (8) automatically de-energize said first switching means (4, 5) so as to break the connection between the battery (3) and the reversible electrical machine (2) when the voltage is detected by them to be dropped below a pre-determined threshold value.

3. Hybrid propulsion system according to claim 2, characterized in that, after the connection between the battery (3) and the reversible electrical machine (2) has been so broken automatically, the internal-combustion engine (1) can only be started through a temporary energization of said first switching means (4, 5), brought about by the intentional operation of second switching means (11) connected to said control means (8), which establishes the connection between the battery (3) and the reversible electrical machine (2).

4. Hybrid propulsion system according to claim 3, characterized in that said second switching means comprise a manually actuatable switch (11).

5. Hybrid propulsion system claim 1, characterized in that it comprises circuit means (87, 67, 69) that are adapted to transfer to display means (13) the value of the voltage detected by said control means (8).

6. Hybrid propulsion system claim 1, characterized in that it comprises biased means (10) adapted to prevent a current from flowing directly from the reversible electrical machine (2) to the battery (3).

7. Hybrid propulsion system claim 1, characterized in that the reversible electrical claim (2) consists of a permanent-magnet motor or a dynamotor.

8. A motor sweeper, characterized in that it is equipped with a hybrid propulsion system claim 1.

* * * * *